United States Patent Office 3,492,149
Patented Jan. 27, 1970

3,492,149
SURFACE MODIFIED HARD INORGANIC SOLID
AND METHOD OF MAKING SAME
William A. Zisman, Silver Spring, and Jacques G. O'Rear,
Camp Springs, Md., assignors to the United States of
America as represented by the Secretary of the Navy
No Drawing. Filed Oct. 31, 1967, Ser. No. 679,561
Int. Cl. B44d 1/092; C03c 17/28; C23f 17/00
U.S. Cl. 117—75
6 Claims

ABSTRACT OF THE DISCLOSURE

Hard inorganic solid surfaces are primed with a film which, essentially, is an adsorbed monolayer of an ω-(p-chlorophenyl)alkylsuccinic or glutaric acid in which the alkyl group is a straight chain having from 1 to 19 carbon atoms. The film is a coupling agent for promoting bonding of organic coatings to the solids.

---

The invention described herein may be manufactured and used by or for the Government of the United States of America for governmental purposes without the payment of any royalties thereon or therefor.

This invention relates to surface modification of hard inorganic solids, more particularly for promoting bonding of organic coatings to the solids.

BACKGROUND OF INVENTION

In the coating of solid surfaces using liquid organic film-forming compositions it is essential to achievement of good bonding of the organic coatings to the solids that the applied liquid compositions spread spontaneously on the solid surfaces. By freely spreading, they will completely wet the solid surfaces, including hills and valleys, to almost completely eliminate the occurrence of air bubbles and voids at the coating-solid interface.

Solids can be conveniently separated into two classes: those of high surface energy and those of low surface energy. High surface energy solids are normally hard, have high melting points and surface energy values in the range of from about 5000 to 500 ergs/cm.$^2$ at ordinary temperatures. Examples are the hard inorganic materials such as glass, fused quartz, ceramics, α-alumina, most metals, and various metals, oxides and nitrides. Low surface energy solids are normally soft, have low melting points and surface energy values generally under 100 ergs/cm.$^2$ at ordinary temperatures. Examples are solid organic polymers, waxes, resins and in fact most organic compounds.

Liquids (excepting the liquid metals) have low surface energies, less than 100 ergs/cm.$^2$ at ordinary temperatures. A liquid will spread spontaneously on a solid when the surface energy of the liquid is less than that of the solid. Thus, liquids will spread freely on high energy solid surfaces since a large decrease in the surface energy of the system will result. But in the case of low energy solids, the surface energies of the liquids are comparable to those of the solids and systems are to be encountered which show nonspreading, that is, the liquid will have a surface tension, $\gamma_{LV}$, which is greater than the critical surface tension of wetting, $\gamma_c$, of the solid.

Since many organic coating compositions are applied as solutions having low surface tensions it might be supposed that they would invariably spread spontaneously on hard inorganic solids. Such is usually not the case, however. This is because high surface energy solids quickly adsorb water or organic compounds to form thereon an adsorbed monolayer of low surface energy on which the applied coating composition will not spread. In such systems the liquid coating compositions have a surface tension higher than the critical surface tension of wetting of the adsorbed monolayer of the contaminent. In this respect, the critical surface tension of wetting of an adsorbed monolayer of water is 30 dynes/cm. at 20° C. and of an adsorbed monolayer of a number of polar-nonpolar organic compounds, for example, of fatty acids and amines, is 30 dynes/cm. or at 20° C. or less. To spread spontaneously on such adsorbed monolayers, a liquid organic coating composition must have a surface tension which is less than 30 dynes/cm. A consequence of the nonspreading is to unnecessarily limit the number of liquid organic coating compositions which may be successfully applied for coating high surface energy solids with organic film-forming materials.

It is an object of the present invention to provide hard inorganic solids with a novel primer which promotes good bonding of organic coatings to the solids.

It is also an object to provide an improved method of coating organic film-forming materials on hard inorganic solids.

It is a further object to provide a method of coating organic film-forming materials on hard inorganic solids in which a greater number of common liquid organic coating compositions having low surface tensions may be successfully applied for the coating.

The above and other objects are accomplished following the present invention through the priming of high surface energy solids with a film which, essentially, is an adsorbed monolayer of an ω-p-chlorophenyl alkyl succinic or glutaric acid of the general formula:

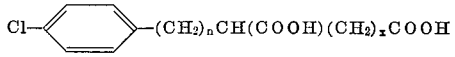

wherein $n$ is an integer from 1 to 19 and $x$ is an integer from 1 to 2. Examples of these dicarboxylic acids are ω-p-chlorobenzyl-, ω-p-(chlorophenyl)propyl-, ω-(p-chlorophenyl)hexyl-, ω-(p-chlorophenyl)decyl-, ω-(p-chlorophenyl)octadecyl- and ω-(p-chlorophenyl)eicosyl-succinic acids, etc.; 2-[ω - (p-chlorophenyl)benzyl]-, 2 - [ω - (p-chlorophenyl)propyl]-, 2 - [ω - (p-chlorophenyl)hexyl]-, 2 - [ω - (p-chlorophenyl)decyl]-, 2-[ω-(p-chlorophenyl)dodecyl]-, 2 - [ω-(p-chlorophenyl)octadecyl]-, and 2-[ω-(p-chlorophenyl)eicosyl]glutaric acids, etc.

The dicarboxylic acids of the above series may be prepared from the monocarboxylic, ω - (p - chlorophenyl) alkanoic acids of the general formula,

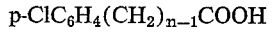

wherein $n-1$ is an integer from 1 to 19, using known procedures for conversion of the monocarboxylic acids to the intermediate ω-(p-chlorophenyl)alkylmalonic acid ethyl esters which, as the sodio derivative, are condensed with either bromoethylacetate or 3-bromoethylpropionate following the method of Ramart-Lucas and Papadakis, Ann. de Chemie, 18, 37 (1932) with modification in respect to the separation and purification of the product acids. The preparation of the dicarboxylic acids is indicated by the following sequence of reactions.

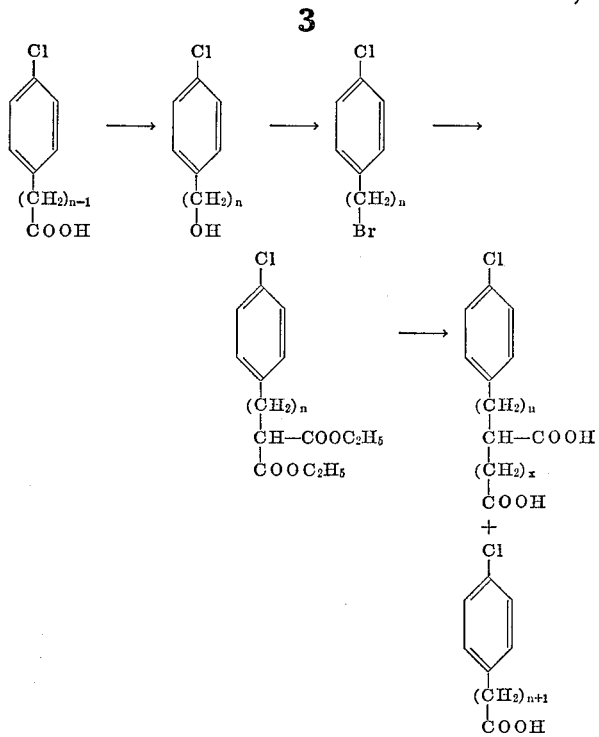

Among the monocarboxylic acids of the above general formula, p-chlorophenylacetic, 3-(p-chlorophenyl)propionic, 6-(p-chlorophenyl)hexanoic and 10-(p-chlorophenyl)decanoic acids are known and have been reported in the literature. The other acids of this series may be prepared by the method of Fieser, Leffler and Co-workers, J. Amer. Chem. Soc. 70, 3197 (1948), in which the Wolff-Kishner procedure, as modified by Huang-Minlon, is used for reduction of the corresponding ω-(p-chlorobenzoyl)alkanoic acids.

In the synthesis of the 2-alkyl substituted succinic and glutaric acids, the starting monocarboxylic acid is reduced to the alcohol using lithium aluminum hydride. The alcohol is converted to the bromide by the procedure of Collins and Davis, J. Chem. Soc. 1961, 1863, using 50% HBr. Following the method of Ramart-Lucas and Papadakis, above, the bromide is reacted with sodio diethyl malonate to form the alkylated diethyl malonate which is then condensed with either ethyl bromoacetate, for the succinic acid, or ethyl 3-bromopropionate for the glutaric acid, the resulting triester saponified with aqueous 20% KOH solution, the alcohol flash evaporated from the saponified mixture, and the alkaline residue acidified with strong hydrochloric acid to give the triacid. The acidified mixture is extracted with ether. The ether extract is concentrated to form a crude syrupy triacid which is decarboxylated by heating to yield a crystalline residue. The principal components of the crystalline residue are the product dicarboxylic acid of the formula:

p-ClC$_6$H$_4$(CH$_2$)$_n$CH(COOH)(CH$_2$)$_x$COOH a monocarboxylic acid of the formula:

p-ClC$_6$H$_4$(CH$_2$)$_{n+1}$COOH and an ether of the formula: p-ClC$_6$H$_4$(CH$_2$)$_n$OC$_2$H$_5$. These are separated by dissolving the crystalline residue from the decarboxylation in a mixture of ether and benzene and coprecipitating the two acids as ammonium salts by bubbling an excess of ammonia into the solution. The ammonium salts are collected by filtration and acidified by the addition of hydrochloric acid. The acidified mixture of the free acids is extracted with ether and the extract concentrated. This procedure is repeated several times, after which the mixture of the regenerated acids is resolved by dispersing the mixture in boiling hexane and equilibrating the system at room temperature.

The precipitated dicarboxylic acid is collected by filtration and recrystallized from hexane. The monobasic acid is precipitated by cooling the filtrate to a low temperature, e.g., −10° C., and recrystallized from hexane.

Preparation of the dicarboxylic acids of the above series is illustrated by the synthesis of 2[ω-(p-chlorophenyl)-dodecyl] glutaric acid, p-ClC$_6$H$_4$(CH$_2$)$_{12}$CH(COOH)(CH$_2$)$_2$COOH which is described in the following example.

EXAMPLE

An alcoholic sodium ethoxide solution is prepared by reacting sodium (6.8 g.; 0.30 g. atom) with dry ethanol (400 ml.). 50 g. (0.31 mole) of diethyl malonate is added thereto under stirring. During a period of one hour, a total of 75 g. (0.208 mole) of ω-p-chlorophenyldodecylbromide is added to the mixture under reflux and stirring. Stirring and refluxing are continued for four more hours. After flash evaporation of the alcohol, the residue is extracted with ether, the ether extract washed with water, dried over magnesium sulfate and distilled to yield the crude diethyl ω-(p-chlorophenyl)dodecylmalonate (B.P. 245° C./1.5 mm.; yield 59%).

An alcoholic ethoxide solution is prepared by reacting sodium (2.53 g.; 0.11 g. atom) with dry ethanol (500 ml.). To this solution, at 60° C. and under stirring, is added, dropwise, 48.3 g. (0.11 mole) of diethyl ω-(p-chlorophenyl) dodecylmalonate. During a period of one hour, a total of 19.9 g. (0.11 mole) of ethyl 3-bromo propionate is added to the mixture under reflux and stirring. The stirring and reflux are continued for four more hours. To the reaction mixture is then added 300 ml. of aqueous 20% KOH solution and the resulting mixture refluxed under stirring for 2 hours. After the alcohol is flash evaporated from the saponification mixture, the alkaline residue is acidified by the addition of 6 N HCl and the acidified mixture extracted with ether. The ether extract is concentrated to a crude syrup mass of the triacid and subjected to heating for 2 hours at 160° C. to effect decarboxylation. Yield of crystalline residue, 45 g. The decarboxylation residue is dissolved in a mixture of ether (400 ml.) and benzene (400 ml.) and the two acids, mono and dicarboxylic, coprecipitated as ammonium salts by bubbling an excess of ammonia through the solution. The two ammonium salts are collected by filtration and acidified with hydrochloric acid. The acidified mixture of regenerated acids is extracted with ether and the extract concentrated by evaporation. After being carried through their ammonium salts three times, the regenerated mixed acids are resolved by dispersing the mixture in boiling hexane (1000 ml.) and equilibrating the system at room temperature. The precipitated dicarboxylic acid is collected and recrystallized from hexane to yield the analytically pure dibasic acid, 2-[ω-(p-chlorophenyl)dodecyl] glutaric acid (M.P. 85–86° C.–32.5% yield). The monobasic acid is precipitated by cooling the filtrate to −10° C. A recrystallization of this precipitate from hexane provides the analytically pure ω-(p-chlorophenyl) tetradecanoic acid (26.8% yield).

In like manner, using ethyl bromoacetate in place of the ethyl 3-bromopropionate, analytically pure ω-(p-chlorophenyl)dodecylsuccinic acid (M.P. 87–88° C.) is obtained.

The 2-alkyl substituted succinic and glutaric acids of the above formula adsorb by means of the pair of polar carboxyl groups to hard inorganic solids to provide thereon an adsorbed monolayer which has an outer surface consisting of closely packed p-chlorophenyl groups, oriented away from the solids, and a critical surface tension of wetting, $\gamma_c$, of 40 dynes/cm. at 20° C.

The presence of an adsorbed monolayer of a dicarboxylic acid of the above general formula on hard inorganic solids, for example, those described above, provides a new surface on the solids to which water and polar-nonpolar organic compounds having surface energies less than that of the adsorbed monolayer will not adsorb. The p-chlorophenyl groups being very hydrophobic, water molecules will not concentrate on the adsorbed monolayer. The surface energy differences between the adsorbed monolayer and the aforesaid polar-nonpolar organic compounds being small, the latter will not adsorb to the monolayer.

Any liquid organic coating composition which has a surface tension less than the critical surface tension of wetting of the adsorbed monolayer of the acid will spread spontaneously on the adsorbed monolayer to provide improved coating of organic film-forming materials on hard inorganic solids. They may be applied to the solid surfaces, primed with an adsorbed monolayer of the acid, in conventional manner, as by spraying, dipping or brushing. The spreading liquid compositions will displace water or a polar-nonpolar organic compound as defined above from the adsorbed monolayer since they are but lightly held on the monolayer. Typical of liquid organic coating compositions which are nonspreading on an adsorbed film of water or of one of the aforedefined polar-nonpolar organic compounds on hard inorganic solids but which will spread freely on an adsorbed monolayer on hard inorganic solids following the present invention are low surface tension solutions of hydrocarbon polymers, e.g., polystyrene, in solution in benzene or toluene, which solvents have surface tensions of 28 dynes/cm. at 20 C.; solutions in benzene or toluene of a vinyl ester polymer, such as polyvinyl acetate, or of a methacrylic ester polymer, such as polymethyl methacrylate, and liquid epoxy resin mixtures, such as 2,2-bis(4-hydroxyphenyl) propane and m-phenylene diamine or m-aminobenzylamine.

In the practice of the invention, an adsorbed monolayer of one of the dicarboxylic acids of the above formula is provided on hard inorganic solids, for example, glass, steel, chromium, cadmium, nickel, zinc, etc., by immersing the solid in a bath which is at ordinary temperatures and is a dilute solution of the dicarboxylic acid in a volatile solvent having a surface tension higher than the critical surface tension of wetting of the adsorbed monolayer of the dicarboxylic acid, allowing contact of the solution with the solid for a period of time sufficient to form the adsorbed monolayer on the solid, generally about 10 minutes, and withdrawing the solid from the bath in a vertical direction. Withdrawal of the solid in a vertical direction gives better draining of solution from the adsorbed monolayer on the solid. The presence of an adsorbed monolayer on the treated solid can be visually observed by noting retraction (rolling away) of solution from the interface with the adsorbed monolayer as the solid is withdrawn vertically from the bath.

Ethanol-water mixtures are suitable as high surface tension solvents for forming the dilute solution of the dicarboxylic acids. Water has a surface tension of 72 dynes/cm. at 20° C. Ethanol has a surface tension of 22 dynes/cm. at 20° C. The dicarboxylic acids are first dissolved in ethanol. Water is added to the ethanol solutions to form mixed solvent solutions which have surface tensions higher than the critical surface tension of wetting of the adsorbed monolayer of the dicarboxylic acid. The amount of water added is controlled to avoid precipitation of the dicarboxylic acid from the solution. Suitable proportions of ethanol and water for forming the high surface tension mixed solvent solutions of the dicarboxylic acids are of the order of 1:7 parts by weight ethanol to water.

Concentrations of the dicarboxylic acids in the dilute solutions may vary from about 0.01 to 5% by weight, with a practical range generally being from about 0.1 to 2% by weight. The higher concentrations of the dicarboxylic acids tend to promote a faster rate of formation of the adsorb monolayer on the solids.

A particular application of an adsorbed monolayer of a dicarboxylic acid of the above series is as a primer on strands of freshly formed continuous glass filaments to protect the filaments against adsorption of water and undesirable low surface tension polar-nonpolar organic materials as defined above and improve the bonding thereto of low surface tension liquid resinous adhesives, such as liquid epoxy resin-amine-curing agent mixtures, which are applied for forming filament-wound, glass fiber-resin, hollow structures. The strands of freshly formed continuous glass filaments are drawn through a room temperature bath of a dilute solution of the dicarboxylic acid, for example, ω-(p-chlorophenyl)dodecylsuccinic acid and 2-[ω-(p-chlorophenyl)dodecyl] glutaric acid, in a high surface tension ethanol-water mixture, which may be one of a 1:7 ratio by weight of ethanol to water, at a rate to provide contact between the solution and the glass filaments for a time sufficient to effect adsorption of a monolayer of the dicarboxylic acid to the filaments, for example, about 10 minutes, and the treated filaments withdrawn from the bath in a vertical direction.

Another particular application of an adsorbed monolayer of one of the dicarboxylic acids of the above series is in the priming of the walls of tooth cavities to promote bonding thereto of plastic fillings such as commercially available epoxy resin fillings which contain an accelerator for room-temperature curing. The tooth is prepared by grinding off the outer surface of the walls of the cavity, under dry conditions, exposing a fresh surface of hydroxyapatite of the tooth which is then directly swabbed with a dilute solution of one of the dicarboxylic acids, e.g. 0.1% by weight of the dicarboxylic acid, in a high surface tension ethanol-water mixture. After a period of about ten minutes a monolayer of the dicarboxylic acid is adsorbed to the hydroxyapatite of the walls of the cavity. The epoxy resin filling, as a highly viscous mass, is then worked into the cavity to make contact with the adsorbed monolayer of the dicarboxylic acid on the walls of the cavity. The presence of the adsorbed monolayer on the cavity walls promotes flow thereon of the filling, while it is still plastic, to reach and make contact with tiny hills and valleys on the cavity walls and thereby give better bonding of the filling to the tooth.

While for the practice of the invention it is essential that the hard inorganic solids be primed with an adsorbed monolayer of a dicarboxylic acid of the above series, the invention may also be practiced to advantage when the adsorbed monolayer is overlaid with a deposited layer of one or two molecules of the dicarboxylic acid.

Although the invention has been described herein with reference to certain specific embodiments thereof, such are intended by way of illustration and not in limitation.

What is claimed and desired to be secured by Letters Patent of the United States is:

1. A hard inorganic solid to which is adsorbed a monolayer of an ω-(p-chlorophenyl)alkyldicarboxylic acid of the general formula:

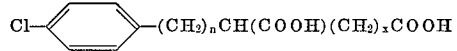

wherein $n$ is an integer from 1 to 19 and $x$ is an integer from 1 to 2.

2. An article as defined in claim 1, wherein the hard inorganic solid is a metal.

3. An article as defined in claim 1, wherein the hard inorganic solid is a strand of glass filaments.

4. A method of coating a hard inorganic solid surface with an organic film-forming material which comprises priming the hard inorganic solid surface with an adsorbed monolayer of an ω-(p-chlorophenyl)alkyldicarboxylic acid of the general formula:

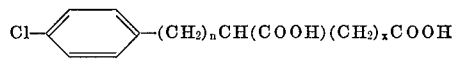

wherein $n$ is an integer from 1 to 19 and $x$ is an integer from 1 to 2, and applying thereto a liquid organic coating composition having a surface tension lower than the critical surface tension of wetting of the adsorbed monolayer of the dicarboxylic acid.

5. A method as defined in claim 4, wherein the hard inorganic solid surface is a metal surface.

6. A method of coating a strand of glass filaments with a liquid organic adhesive which comprises priming the strand of glass filaments with an adsorbed monolayer of an ω-(p-chlorophenyl)alkyldicarboxylic acid of the general formula:

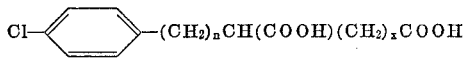

wherein $n$ is an integer from 1 to 19 and $x$ is an integer from 1 to 2, and applying thereto a liquid organic adhesive having a surface tension lower than the critical surface tension of wetting of the adsorbed monolayer of the dicarboxylic acid.

References Cited

UNITED STATES PATENTS 2,984,586  5/1961  Koon.
3,411,939  11/1968  Hunter et al. _____ 117—121 X WILLIAM D. MARTIN, Primary Examiner R. HUSACK, Assistant Examiner U.S. Cl. X.R.

32—15; 117—47, 54, 87, 88, 89, 92, 121, 126, 127, 134, 167; 260—521